March 24, 1959  F. M. O'BRIEN, JR  2,878,609
GUIDES FOR THE FISHING LINES OF FISHING RODS
Original Filed Feb. 14, 1956
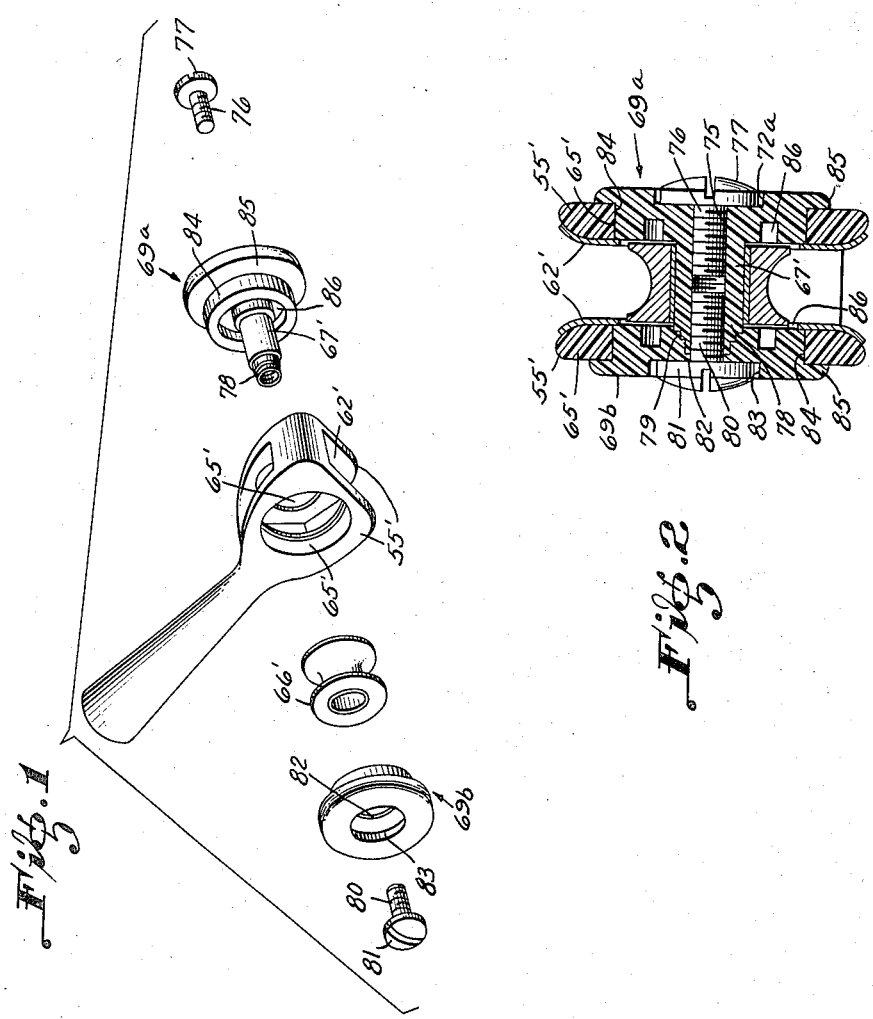
INVENTOR.
Frank M. O'Brien, Jr.
BY  WILKINSON
MAWHINNEY &
THEIBAULT
ATTORNEYS

United States Patent Office 2,878,609
Patented Mar. 24, 1959

2,878,609

GUIDES FOR THE FISHING LINES OF FISHING RODS

Frank M. O'Brien, Jr., Miami, Fla., assignor, by mesne assignments, to Tycoon Finnor Corporation, Miami Springs, Fla., a corporation of Florida Original application February 14, 1956, Serial No. 565,418. Divided and this application June 5, 1957, Serial No. 666,797

6 Claims. (Cl. 43—24)

The present invention relates to guides for the fishing lines of fishing rods and has for an object to provide a novel form of roller top assembly for the fishing line.

This is a division of my application, Serial Number 565,418 which was filed on February 14, 1916.

The present invention contemplates molding the plastic, such as nylon, around the stainless steel insert or bushing or inserting the bushing into the cast nylon body so that an economy and ease in manufacture will be effected as this is made possible by the use of such a plastic as nylon and the stainless steel insert will protect the nylon from the wearing action of the fishing line.

The present invention also contemplates the provision of a guide of this character having mounted therein a pulley over which the fishing line travels so that the pulley absorbs most of the supporting strain and wear caused by the paying out and reeling in of the fishing line.

A further object of the present invention is to provide a device of this type in which the parts are especially adapted to resist deterioration due to exposure to water and the elements.

With the foregoing and other objects in view, the invention will be hereinafter more fully described and more particularly pointed out in the appended claims.

In the drawings in which the same parts are denoted by the same reference numerals throughout the several views, Figure 1 is an exploded isometric view of a roller line guide according to the invention.

Figure 2 is a cross section taken on an enlarged scale through the same in assembled form.

Referring more particularly to Figures 1 and 2, 55' indicates the side walls of the nylon body of the tip roller guide, and 62' represents the side walls of the metallic insert. The apertures 65' in the side walls 55' and 62' admit of introducing and removing the grooved roller 66', which may have a steel body and a bronze bearing sleeve.

Pursuant to this construction, the hollow internally threaded shaft 67' is externally smooth to rotatably receive thereupon the grooved roller 66' and the shaft 67' is of nylon or other plastic material molded at one end directly to one button or disk 69a which constitutes one side plate. The other button or disk 69b which constitutes the opposing side plate is also preferably formed of molded nylon or other appropriate plastic in a separate molding operation from the side plate 69a and its shaft 67'. In the side plate 69a is a threaded socket 75 for receiving therein a dummy screw 76 having a screw head 77 adapted to fit into a countersink or counterbore 72a which is exposed on the outer face of the side plates 69a.

A pilot stem is provided on the free end of the shaft 67', such pilot stem being designated at 78 and being positioned to fit into a socket 79 in the side plate 69b for orienting and centering the side plate 69b relatively to the axial line of the hollow internally threaded shaft 67'.

A binding screw 80 is adapted to be passed through the smooth bore 82 of the side plate 69b and to enter the pilot end of the shaft 67' so as to engage with the internal screw threads of this shaft. The screw 80 is provided with an enlarged screw head 81 adapted to be received into a counterbore 83 in the external face of the side plate 69b. Shoulders 84 are provideed upon the side plates 69a and 69b adapted to take into the apertures 65' of the side walls 55' and 62'. The side plates 69a and 69b are also provided with flanges 85 extending outwardly from the shoulders 84 and adapted to embrace the side walls 55' for limiting the inward movement of the side plates 69a and 69b with reference to the apertures 65'. On their inner faces, radially inwardly of the shoulders 84, the side plates 69a and 69b are provided with annular grease grooves 86 which are adapted to be exposed against the sides of the grooved roller 66'.

A suitable grease is charged into these grooves 86 prior to assembly and they therefore constitute reservoirs for maintaining an adequate supply of grease in contact with the sides of the roller for a long period of time. In this way the roller may rotate at a high revolution rate noiselessly and with long life.

It is obvious that various changes and modifications may be made in the details of construction and design of the above specifically described embodiment of this invention without departing from the spirit thereof, such changes and modifications being restricted only by the scope of the following claims.

What I claim is:

1. A line guide for fishing rods comprising a guide body having longitudinal and lateral openings therethrough, side plates fitted in the lateral openings, an internally threaded tubular shaft carried by one side plate and having a free end adapted to be fitted to the companion side plate, said companion side plate having a perforation in line with the shaft, and a screw mounted through the perforation and received into the threads of the shaft, said screw having an enlarged head engaging against the outer side of the companion side plate.

2. A line guide for fishing rods comprising a guide body having longitudinal and lateral openings therethrough, a pair of side plates fitted to the lateral openings, an internally threaded shaft molded in one piece with one side plate and having a reduced pilot stem at its free end, the companion side plate having a socket for receiving the pilot stem and a smooth bore in line with the socket and shaft, and a screw freely movable through the smooth bore and through the pilot stem and engageable with the internal threads of the tubular shaft, said screw having an enlarged head engageable against the outside surface of the companion side plate.

3. A line guide for fishing rods comprising a guide body having longitudinal and lateral openings therethrough, a pair of nylon molded side plates having shoulders fitted to the lateral openings and flanges outwardly of the shoulders for engaging against the external parts of the sides of the line guide body, a nylon tubular shaft having internal threads molded in one piece with one of the side plates and having a pilot stem extending off its free end, the side plate carrying the shaft having a screw socket in substantially axial alignment with the axis of the shaft and opening outwardly therefrom, a dummy screw fitted to said screw socket having an enlarged head engageable against an outside portion of the side plate carrying the shaft, the companion side plate having a smooth bore therethrough, and a binding screw freely movable through the smooth bore and through the pilot stem and engageable with the threads of the shaft, said binding screw having an enlarged head engageable against an outside surface of the companion side plate.

4. A line guide for fishing rods having longitudinal and lateral openings therethrough, a pair of side plates fitted to the lateral openings, a shaft extending between said side plates, means for binding the side plates to the shaft, a roller on the shaft having side portions engageable with the side plates, said side plates having grease carrying grooves in the portions thereof engaged by the sides of said roller.

5. A line guide for fishing rods comprising a guide body having longitudinal and lateral openings therein, side plates fitted to the lateral openings, a shaft carried between said side plates, means for detachably binding the shaft and the side plates together, a roller on the shaft between the side plates, one side plate having a screw socket, and a dummy screw fitted to said socket and having an enlarged head bearing against the outer side plate in which the screw socket is provided.

6. A line guide for fishing rods comprising a guide body having longitudinal and lateral openings therethrough, side plates removably fitted to the lateral openings and having bores and counterbores therein with the counterbore opening through the outside faces of the plates, one of said bores being formed to provide a threaded socket, a dummy screw fitted in said socket and having an enlarged head occupying the counterbore of the same side plate, the companion side plate having an internal socket at the inner end of the bore, a shaft carried by one plate having the dummy screw socket, said shaft having at its free end a pilot stem adapted to be fitted into the socket in the companion plate, a roller mounted on said shaft between the two side plates, and a binding screw fitted through the bore and socket of the companion side plate and threaded into the free end of said shaft, said binding screw having an enlarged head occupying the counterbore of the companion side plate.

References Cited in the file of this patent

UNITED STATES PATENTS

| | | |
|---|---|---|
| 1,959,989 | Reynolds | May 22, 1934 |
| 2,226,295 | Lee | Dec. 24, 1940 |
| 2,262,300 | Reynolds | Nov. 11, 1941 |
| 2,326,828 | Camp | Aug. 17, 1943 |
| 2,478,131 | Rossi | Aug. 2, 1949 |
| 2,502,846 | Hoffman | Apr. 4, 1950 |
| 2,597,738 | Koos | May 20, 1952 |